(12) United States Patent
Motoi

(10) Patent No.: US 11,862,862 B2
(45) Date of Patent: Jan. 2, 2024

(54) COMMUNICATION DEVICE

(71) Applicant: NEC Corporation, Tokyo (JP)

(72) Inventor: Keiichi Motoi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 375 days.

(21) Appl. No.: 17/274,303

(22) PCT Filed: Sep. 6, 2019

(86) PCT No.: PCT/JP2019/035178
§ 371 (c)(1),
(2) Date: Mar. 8, 2021

(87) PCT Pub. No.: WO2020/054611
PCT Pub. Date: Mar. 19, 2020

(65) Prior Publication Data
US 2021/0344124 A1    Nov. 4, 2021

(30) Foreign Application Priority Data

Sep. 10, 2018    (JP) ................. 2018-168805

(51) Int. Cl.
*H01Q 25/02* (2006.01)
*H01P 5/22* (2006.01)
(Continued)

(52) U.S. Cl.
CPC ............ *H01Q 25/02* (2013.01); *H01P 5/225* (2013.01); *H01Q 21/24* (2013.01); *H04B 1/40* (2013.01)

(58) Field of Classification Search
CPC .......... H01Q 21/065; H01Q 7/00; H01Q 1/38; H01Q 23/00; H01Q 25/02; H01Q 1/3233;
(Continued)

(56) References Cited

U.S. PATENT DOCUMENTS 5,767,814 A    6/1998   Conroy et al.
6,208,294 B1*  3/2001   Kobayakawa ........... H01Q 3/40
                                                    342/368
(Continued)

FOREIGN PATENT DOCUMENTS

JP    H04-111502 A    4/1992
JP    H08-111651 A    4/1996
(Continued)

OTHER PUBLICATIONS

International Search Report for PCT Application No. PCT/JP2019/035178, dated Oct. 29, 2019.
(Continued)

*Primary Examiner* — Ajibola A Akinyemi
(74) *Attorney, Agent, or Firm* — Sughrue Mion, PLLC

(57) ABSTRACT

A communication device includes a first antenna element, a second antenna element, a 180-degree hybrid circuit having a first port configured to generate a sum signal from multiple input signals and a second port configured to generate a difference signal from multiple input signals, a first phase shifter coupled with the 180-degree hybrid circuit to carry out a phase shift by a first phase value, and a second phase shifter coupled with the 180-degree hybrid circuit to carry out a phase shift by a second phase value. The first antenna element is connected to the first port of the 180-degree hybrid circuit while the second antenna element is connected to the second port of the 180-degree hybrid circuit.

5 Claims, 8 Drawing Sheets

(51) Int. Cl.
*H01Q 21/24* (2006.01)
*H04B 1/40* (2015.01)

(58) Field of Classification Search
CPC .......... H01Q 3/24; H01Q 11/08; H01Q 21/24; H01Q 1/22; H01Q 1/2208; H01Q 1/2283; H01Q 1/2291; H01Q 21/205; H01Q 3/26; H01Q 9/285; H01Q 1/42; H01Q 25/002; H01Q 25/04; H01Q 3/08; H01Q 9/27; H01Q 21/062; H01Q 3/2605; H01Q 9/0435; H01Q 1/3283; H01Q 1/48; H01Q 1/525
USPC ........................................................ 455/13.3
See application file for complete search history.

(56) References Cited

U.S. PATENT DOCUMENTS

2005/0117545 A1\* 6/2005 Wittwer ................. H04B 7/084
370/332
2012/0280885 A1\* 11/2012 Arai ......................... H01Q 3/26
343/860
2017/0077986 A1 3/2017 Ellä et al.

FOREIGN PATENT DOCUMENTS

| JP | H08-237002 A | 9/1996 |
|---|---|---|
| JP | 2001-189624 | 7/2001 |
| JP | 2014-093767 A | 5/2014 |
| JP | 2017-520164 A | 7/2017 |
| WO | 2011/083712 A1 | 7/2011 |
| WO | 2014/083948 A1 | 6/2014 |

OTHER PUBLICATIONS

Tze-Min Shen, Ting-Yi Huang, Chi-Feng Chen, and Ruey-Beei Wu, "A Laminated Waveguide Magic-T With Bandpass Filter Response in Multilayer TCC", IEEE Transactions on Microwave Theory and Techniques, vol. 59, No. 3, pp. 584-592, Mar. 2011.

\* cited by examiner

COMMUNICATION DEVICE

This application is a National Stage Entry of PCT/JP2019/035178 filed on Sep. 6, 2019, which claims priority from Japanese Patent Application 2018-168805 filed on Sep. 10, 2018, the contents of all of which are incorporated herein by reference, in their entirety.

TECHNICAL FIELD

The present invention relates to a communication device.

BACKGROUND ART

Communication technology using multiple polarized waves has been known, for example, it is possible to mention Patent Document 1 and Patent Document 2. Patent Document 1 discloses a communication device using orthogonal-polarization array antennas, in which a hybrid circuit is configured to adjust a phase difference between two radio signals (or RF signals) and to supply power to orthogonal-polarization array antennas, thus establishing communication upon forming a polarization plane. Patent Document 2 discloses an antenna device configured to switch over four polarized waves, i.e. two orthogonally-polarized waves and clockwise or counterclockwise circularly-polarized waves, which includes an orthogonal-polarization feeding array antenna and a hybrid circuit configured to adjust two high-frequency signals in phase. In addition, Non-Patent Document 1 discloses a magic-T circuit having a bandpass-filtering function as an example of a 180-degree hybrid circuit used for a communication device equipped with two antenna elements, which is applicable to a multilayer LTCC (Low-Temperature Co-fired Ceramic) technology.

CITATION LIST

Patent Literature Document

Patent Document 1: Japanese Patent Application Publication No. 2014-093767
Patent Document 2: International Publication No. WO2014/083948

Non-Patent Literature Document

Non-Patent Document 1: Tze-Min Shen, Ting-Yi Huang, Chi-Feng Chen, and Ruey-Beei Wu, "A Laminated Waveguide Magic-T With Bandpass Filter Response in Multilayer LTCC", IEEE Transactions On Microwave Theory and Techniques, VOL 59, NO. 3, pp. 584-591, March 2011

SUMMARY OF INVENTION

Technical Problem

It is necessary for radio communication devices to install bandpass filters (BPS: Bandpass Filter) in order to reduce unwanted radiation when transmitting radio waves while improving communication quality by preventing interference when receiving radio waves. Using a radio-communication semiconductor circuit (RFIC: Radio Frequency IC) as a main circuit of a radio communication device; however, the BPF may occupy an adequate mounting area on the RFIC when the BPF is embedded in the RFIC, which in turn increases the cost of the RFIC and which may be unable to obtain an adequate filtering characteristic with the BPF on the RFIC.

Upon establishing communication by switching over two polarized waves in a time-series manner with a single-system RFIC, in general, it is necessary to prepare switches configured to switch over connection between two antenna elements (or polarization-power-supply ports when using both-polarization-adaptable antenna elements) and to switch over connection between each antenna element and the RFIC, and it is necessary to prepare a bandpass filter between antenna elements and a bandpass filter between switches. That is, it is necessary to prepare the number of bandpass filters in association with the number of polarized waves, which in turn increases the scale of a radio communication device. A similar problem may arise even when the switching function is substituted for the phase adjustment function using a hybrid circuit.

The present invention is made in consideration of the above problem and aims to provide a communication device capable of achieving the bandpass-filtering functions without increasing the circuit scale.

Solution to Problem

In an aspect of the present invention, a communication device a first antenna element, a second antenna element, a 180-degree hybrid circuit having a first port configured to generate a sum signal from a plurality of input signals and a second port configured to generate a difference signal from a plurality of input signals, a first phase shifter coupled with the 180-degree hybrid circuit to carry out a phase shift by a first phase value, and a second phase shifter coupled with the 180-degree hybrid circuit to carry out a phase shift by a second phase value. The first antenna element is connected to the first port of the 180-degree hybrid circuit while the second antenna element is connected to the second port of the 180-degree hybrid circuit.

Advantageous Effects of Invention

The present invention may eliminate the necessity of preparing a bandpass filter for each polarization, and it is therefore possible to reduce the size of a communication device.

DESCRIPTION OF EXEMPLARY EMBODIMENTS

Figure 1:
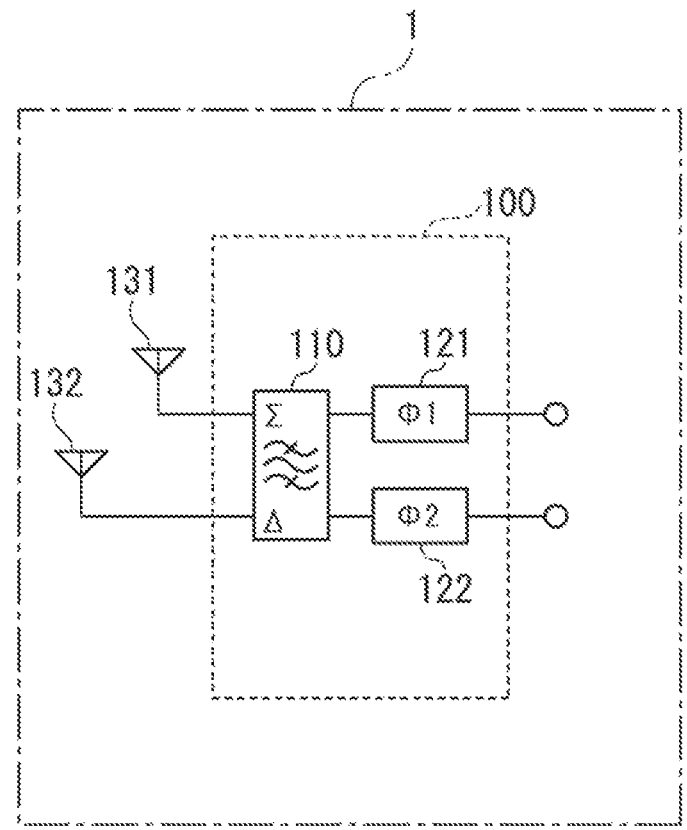
FIG. 1 is a circuit diagram of a communication device according to the first exemplary embodiment of the present invention.

The communication device of the present invention will be described in detail by way of examples with reference to the accompanying drawings. In the drawings, the same reference signs are applied to the same constituent elements, and therefore detailed descriptions thereof will be omitted here.

First Exemplary Embodiment

FIG. 1 shows a communication device 1 according to the first exemplary embodiment of the present invention, which provides a pathway switch device 100 to a first antenna element 131 and a second antenna element 132. The pathway switch device 100 includes a first phase shifter 121, a second phase shifter 122, and a 180-degree hybrid circuit 110. The 180-degree hybrid circuit 110 having a bandpass filtering function is connected to the first phase shifter 121 and the second phase shifter 122.

The first antenna element 131 is connected to a first terminal used to receive or transmit a sigma ($\Sigma$) signal serving as a sum signal from the 180-degree hybrid circuit 110. When the first phase shifter 121 outputs a signal A while the second phase shifter 122 outputs a signal B, the 180-degree hybrid circuit 110 generates a sum signal, i.e. an in-phase composite signal (A+B), such that a phase difference between the signal A and the signal B becomes zero degrees. Upon expressing a phase of a signal X as $\angle X$, a phase difference of zero degrees with respect to phases $\angle A$, $\angle B$ of the signals A, B means $\angle A - \angle B = 0$ degrees. The communication device 1 generates an in-phase composite signal (A+B) in a transmission mode. In a reception mode, the received signal is in-phase-equally delivered to the first phase shifter 121 and the second phase shifter 122 with a phase difference of zero degrees.

The second antenna element 132 is connected to a second terminal used to transmit or receive a delta ($\Delta$) signal serving as a difference signal from the 180-degree hybrid circuit 100. When a phase difference between the output signal A of the first phase shifter 121 and the output signal B of the second phase shifter 122 is equal to 180 degrees (i.e. $\angle A - \angle B = 180$ degrees), an antiphase composite signal (A−B) is generated as the difference signal. Due to antiphase composition setting a phase difference between the signal A and the signal B at 180 degrees, a signal intensity equals $|A-B|=\sqrt{(A^2+B^2)}$, i.e. substantially the same signal intensity as the sum signal. In a transmission mode, the communication device 1 generates an antiphase composite signal (A−B). In a reception mode, the received signal is differentially-equally delivered to the first phase shifter 121 and the second phase shifter 122 with a phase difference of 180 degrees. In this connection, FIG. 1 shows the pathway switch device 100 with its minimum configuration to be shared between the communication devices according to the other exemplary embodiments of the present invention.

The 180-degree hybrid circuit 110 is configured to generate and output a $\Sigma$ signal serving as a sum signal of two input signals and a $\Delta$ signal serving as a difference signal of two input signals. At this time, the 180-degree hybrid circuit 110 is configured to solely pass signals in a passable band therethrough due to the bandpass filtering function.

The first phase shifter 121 and the second phase shifter 122 are each configured to adjust the phase of input signals thereof. Specifically, input signals are adjusted in phase such that a phase difference between the output signal of the first phase shifter 121 and the output signal of the second phase shifter 122 becomes equal to 0 degrees or 180 degrees.

The received signal of the first antenna element 131 is sent to the first terminal used to receive or transmit a $\Sigma$ signal (or a sum signal) received or transmitted with the 180-degree hybrid circuit 110. In addition, the first antenna element 131 radiates into the air a transmission signal as a $\Sigma$ signal output from the first terminal of the 180-degree hybrid circuit 110.

The second antenna element 132 has the same configuration and the same function as the first antenna element 131. The received signal of the second antenna element 132 is sent to the second terminal used to receive or transmit a $\Delta$ signal (or a difference signal) with the 180-degree hybrid circuit 110. In addition, the second antenna element 132 radiates into the air a transmission signal as a $\Delta$ signal output from the second terminal of the 180-degree hybrid circuit 110.

As described above, the communication device 1 according to the first exemplary embodiment of the present invention includes the pathway switch device 100, and therefore it is possible to transmit signals having a frequency corresponding to at least one of a sum signal (or a $\Sigma$ signal) and a difference signal (or a $\Delta$ signal) which are each generated from a signal passing through the first phase shifter 121 and a signal passing through the second phase shifter 122 due to the bandpass-filtering function of the 180-degree hybrid circuit 110. For this reason, it is possible to selectively output a $\Sigma$ signal or a $\Delta$ signal by means of the 180-degree hybrid circuit 110 configured to transmit signals having a frequency corresponding to at least one of the $\Sigma$ signal and the $\Delta$ signal which are each generated from a signal passing through the first phase shifter 121 and a signal passing through the second phase shifter 122. At this time, the bandpass-filtering function of the 180-degree hybrid circuit 110 can be achieved by a bandpass filter having a single configuration shared by the $\Sigma$ signal and the $\Delta$ signal. Accordingly, it is unnecessary for the communication devices according to the exemplary embodiments of the present invention to prepare bandpass filters for the $\Sigma$ signal and the $\Delta$ signal respectively (in other words, it is possible to reduce the number of filters installed in communication devices), and the therefore it is possible to reduce the size of communication devices. In addition, the communication device 1 equipped with the first antenna element 131 applicable to the $\Sigma$ signal and the second antenna element 132 applicable to the $\Delta$ signal does not need any switches configured to switch over the $\Sigma$ signal and the $\Delta$ signal, and therefore it is possible to reduce signal loss.

Second Exemplary Embodiment

Figure 2:
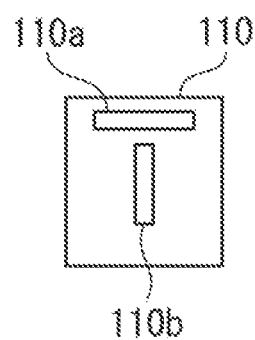
FIG. 2 is a circuit diagram of a magic-T circuit included in a 180-degree hybrid circuit of a communication device according to the second exemplary embodiment of the present invention.

Next, the second exemplary embodiment of the present invention will be described below. The second exemplary embodiment is similarly applied to the communication device 1 of the first exemplary embodiment, in which the 180-degree hybrid circuit 110 has a magic-T circuit having a bandpass-filtering function. As a magic-T circuit having a bandpass-filtering function, it is possible to employ a magic-T circuit disclosed in Non-Patent Document 1. As shown in FIG. 2, this magic-T circuit includes an excitation opening 110a of a first electromagnetic-field mode and an excitation opening 110b of a second electromagnetic-field mode.

As shown in FIG. 2, the excitation opening 110a and the excitation opening 110b are aligned in a T-shape manner. Due to the T-shape alignment, it is possible for the excitation openings 110a, 110b to independently handle two frequency signals which may occur in two electromagnetic-field modes orthogonal to each other. Non-Patent Document 1 assumes TE201 mode and TE202 mode as two orthogonal electromagnetic-field modes. In this connection, the TE mode stands for "Transverse-Electric Mode".

For example, two orthogonal electromagnetic-field modes will be referred to as a first electromagnetic-field mode and a second electromagnetic-field mode. In this case, one excitation opening (e.g. the excitation opening 110a) between two excitation openings is allocated to the first electromagnetic-field mode while the other excitation opening (e.g. the excitation opening 110b) is allocated to the second electromagnetic-field mode. Accordingly, one excitation opening is able to solely handle signals occurring in the first electromagnetic-field mode while the other excitation opening is able to solely handle signals occurring in the second electromagnetic-field mode. In this connection, the frequency of signals occurring in the first electromagnetic-field mode may be identical to or different from the frequency of signals occurring in the second electromagnetic-field mode.

According to the second exemplary embodiment described above, the 180-degree hybrid circuit 110 includes a magic-T circuit having a bandpass-filtering function, in which one excitation opening between two excitation openings 110a, 110b is allocated to the Σ signal while the other excitation opening is allocated to the Δ signal. This makes it possible for the magic-T circuit to independently handle the Σ signal and the Δ signal. That is, it is possible to handle polarization 1 and polarization 2 as two polarized waves. For this reason, it is possible to independently handle the frequency of the Σ signal and the frequency of the Δ signal. By changing the shape of the excitation opening 110a and the shape of the excitation opening 110b, it is possible to independently change the frequency of the Σ signal and the frequency of the Δ signal.

Third Exemplary Embodiment

Figure 3:
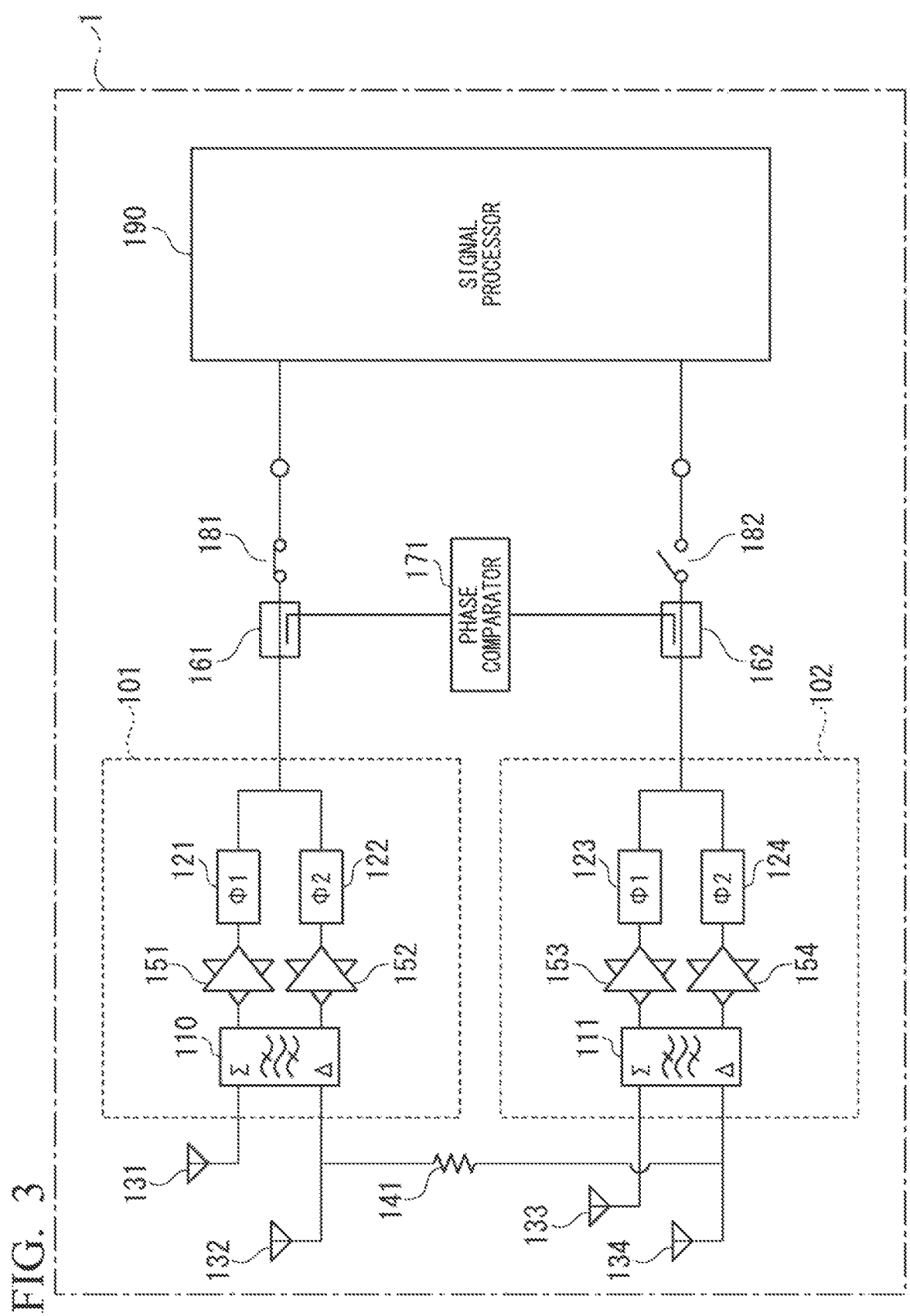
FIG. 3 is a circuit diagram of a communication device according to the third exemplary embodiment of the present invention.

Next, the communication device 1 according to the third exemplary embodiment will be described below. FIG. 3 is a circuit diagram of the communication device 1 according to the third exemplary embodiment of the present invention. The communication device 1 includes a first pathway switch device 101, a second pathway switch device 102, the first antenna element 131, the second antenna element 132, a third antenna element 133, a fourth antenna element 134, an attenuator 141, a first directional coupler 161, a second directional coupler 162, a phase comparator 171, a first switch 181, a second switch 182, and a signal processor 190. In this connection, the first pathway switch device 101 and the second pathway switch device 102 may serve as an example of a "communicator" while the attenuator 141 may serve as an example of a "connector". In addition, each of the first directional coupler 161 and the second directional coupler 162 has three terminals, which will be referred to as a first terminal through a third terminal.

As shown in FIG. 3, a first terminal of the first pathway switch device 101 is connected to the first antenna element 131 while a second terminal thereof is connected to the second antenna element 132 and one end of the attenuator 141. A third terminal of the first pathway switch device 101 is connected to the first terminal of the first directional coupler 161. A first terminal of the second pathway switch device 102 is connected to the third antenna element 133 while a second terminal thereof is connected to the fourth antenna element 134 and another end of the attenuator 141. A third terminal of the second pathway switch device 102 is connected to a first terminal of the second directional coupler 162. A second terminal of the first directional coupler 161 is connected to a first terminal of the phase comparator 171 while a third terminal of the first directional coupler 161 is connected to a first terminal of the first switch 181. A second terminal of the second directional coupler 162 is connected to a second terminal of the phase comparator 171 while a third terminal of the second directional coupler 162 is connected to a first terminal of the second switch 182. A second terminal of the first switch 181 is connected to a first terminal of the signal processor 190 while a second terminal of the second switch 182 is connected to a second terminal of the signal processor 190.

The first pathway switch device 101 includes the 180-degree hybrid circuit 110, the first phase shifter 121, the second phase shifter 122, a first bidirectional amplifier 151, and a second bidirectional amplifier 152. The second pathway switch device 102 includes a 180-degree hybrid circuit 111, a third phase shifter 123, a fourth phase shifter 124, a third bidirectional amplifier 153, and a fourth bidirectional amplifier 154. Each of the 180-degree hybrid circuits 110 and 111 has fourth terminals, which will be referred to as a first terminal through a fourth terminal.

The first terminal of the first pathway switch device 101 is connected to a first terminal (or a Σ port) of the 180-degree hybrid circuit 110 while the second terminal of the first pathway switch device 101 is connected to a second terminal (or a Δ port) of the 180-degree hybrid circuit 110. A third terminal of the 180-degree hybrid circuit 110 is connected to a first terminal of the first bidirectional amplifier 151 while a fourth terminal of the 180-degree hybrid circuit 110 is connected to a first terminal of the second bidirectional amplifier 152. A second terminal of the first bidirectional amplifier 151 is connected to a first terminal of the first phase shifter 121 while a second terminal of the second bidirectional amplifier 152 is connected to a first terminal of the second phase shifter 122. A third terminal of the first pathway switch device 101 is connected to a second terminal of the first phase shifter 121 and a second terminal of the second phase shifter 122.

The first terminal of the second pathway switch device 102 is connected to a first terminal (or a Σ port) of the 180-degree hybrid circuit 111 while the second terminal of the first pathway switch device 102 is connected to a second terminal (or a Δ port) of the 180-degree hybrid circuit 111. A third terminal of the 180-degree hybrid circuit 111 is connected to a first terminal of the third bidirectional amplifier 153 while a fourth terminal of the 180-degree hybrid circuit 111 is connected to a first terminal of the fourth bidirectional amplifier 154. A second terminal of the third bidirectional amplifier 153 is connected to a first terminal of the third phase shifter 123 while a second terminal of the fourth bidirectional amplifier 154 is connected to a first terminal of the fourth phase shifter 124. A third terminal of the second pathway switch device 102 is connected to a second terminal of the third phase shifter 123 and a second terminal of the fourth phase shifter 124.

In the first pathway switch device 101, the first bidirectional amplifier 151 amplifies a signal input from the first phase shifter 121 so as to output the amplified signal to the 180-degree hybrid circuit 110. In addition, the first bidirectional amplifier 151 amplifies a signal input from the 180-degree hybrid circuit 110 so as to output the amplified signal to the first phase shifter 121. The second bidirectional amplifier 152 operates similar to the first bidirectional amplifier 151. That is, the second bidirectional amplifier 152 amplifies a signal input from the second phase shifter 122 so as to output the amplified signal to the 180-degree hybrid circuit 110. In addition, the second bidirectional amplifier 152 amplifies a signal input from the 180-degree hybrid circuit 110 so as to output the amplified signal to the second phase shifter 122.

The first directional coupler 161 branches a signal transmitted over a line laid between the first pathway switch device 101 and the signal processor 190, thus sending a branched signal to the phase comparator 171. The switch 181 is laid between the first pathway switch device 101 and the signal processor 190 and configured to switch between a state capable of transmitting or receiving signals and another state incapable of transmitting or receiving signals. Closing the first switch 181 makes it possible to transmit or receive signals between the first pathway switch device 101 and the signal processor 190. In contrast, opening the first switch 181 may block signals to be transmitted or received between the first pathway switch device 101 and the signal processor 190.

The second pathway switch device 102 operates similar to the first pathway switch device 101. The 180-degree hybrid circuit 111 corresponds to the 180-degree hybrid circuit 110. The third bidirectional amplifier 153 corresponds to the first bidirectional amplifier 151 while the fourth bidirectional amplifier 154 corresponds to the second bidirectional amplifier 152. The third phase shifter 123 corresponds to the first phase shifter 121 while the fourth phase shifter 124 corresponds to the second phase shifter 122.

The third antenna element 133 operates similar to the first antenna element 131. The third antenna element 133 sends its received signal to the first terminal (or the Σ port) of the 180-degree hybrid circuit 111. In addition, the third antenna element 133 radiates into the air a transmission signal as the Σ signal output from the first terminal of the 180-degree hybrid circuit 111.

The fourth antenna element 134 operates similar to the second antenna element 132. The fourth antenna element 134 sends its received signal to the second terminal (or the Δ port) of the 180-degree hybrid circuit 111. In addition, the fourth antenna element 134 radiates into the air a transmission signal as the Δ signal output from the second terminal of the 180-degree hybrid circuit 111.

The third bidirectional amplifier 153 amplifies an input signal from the third phase shifter 123 so as to send the amplified signal to the third terminal of the 180-degree hybrid circuit 111. In addition, the third bidirectional amplifier 153 amplifies an output signal from the third terminal of the 180-degree hybrid circuit 111 so as to send the amplified signal to the third phase shifter 123.

The fourth bidirectional amplifier 154 amplifies an input signal from the fourth phase shifter 124 so as to send the amplified signal to the fourth terminal of the 180-degree hybrid circuit 111. In addition, the fourth bidirectional amplifier 154 amplifies an output signal from the fourth terminal of the 180-degree hybrid circuit 111 so as to send the amplified signal to the fourth phase shifter 124.

The second directional coupler 162 operates similar to the first directional coupler 161. The second directional coupler 162 branches a signal transmitted over a line laid between the second pathway switch device 102 and the signal processor 190, thus sending a branched signal to the phase comparator 171.

The second switch 182 operates similar to the first switch 181. The second switch 182 switches between a state capable of transmitting or receiving signals between the second pathway switch device 102 and the signal processor 190 and another state incapable of transmitting or receiving signals therebetween. Closing the second switch 182 makes it possible to transmit or receive signals between the second pathway switch device 102 and the signal processor 190. In contrast, opening the second switch 182 may block signals to be transmitted or received between the second pathway switch device 102 and the signal processor 190.

The signal processor 190 is configured to carry out signal processing necessary to communicate with an external device. For example, the signal processor is configured to generate a transmission signal via a modulation process in a transmission mode. In a reception mode, the signal processor 190 is configured to carry out a demodulation process of the received signal. In this connection, the signal processor 190 may generate a calibration signal used for calibration of the communication device 1.

The phase comparator 171 is configured to compare two input signals in phase. For example, the phase comparator 171 compares the phase of the branched signal from the first directional coupler 161 with the phase of the branched signal from the second directional coupler 162.

Figure 4:
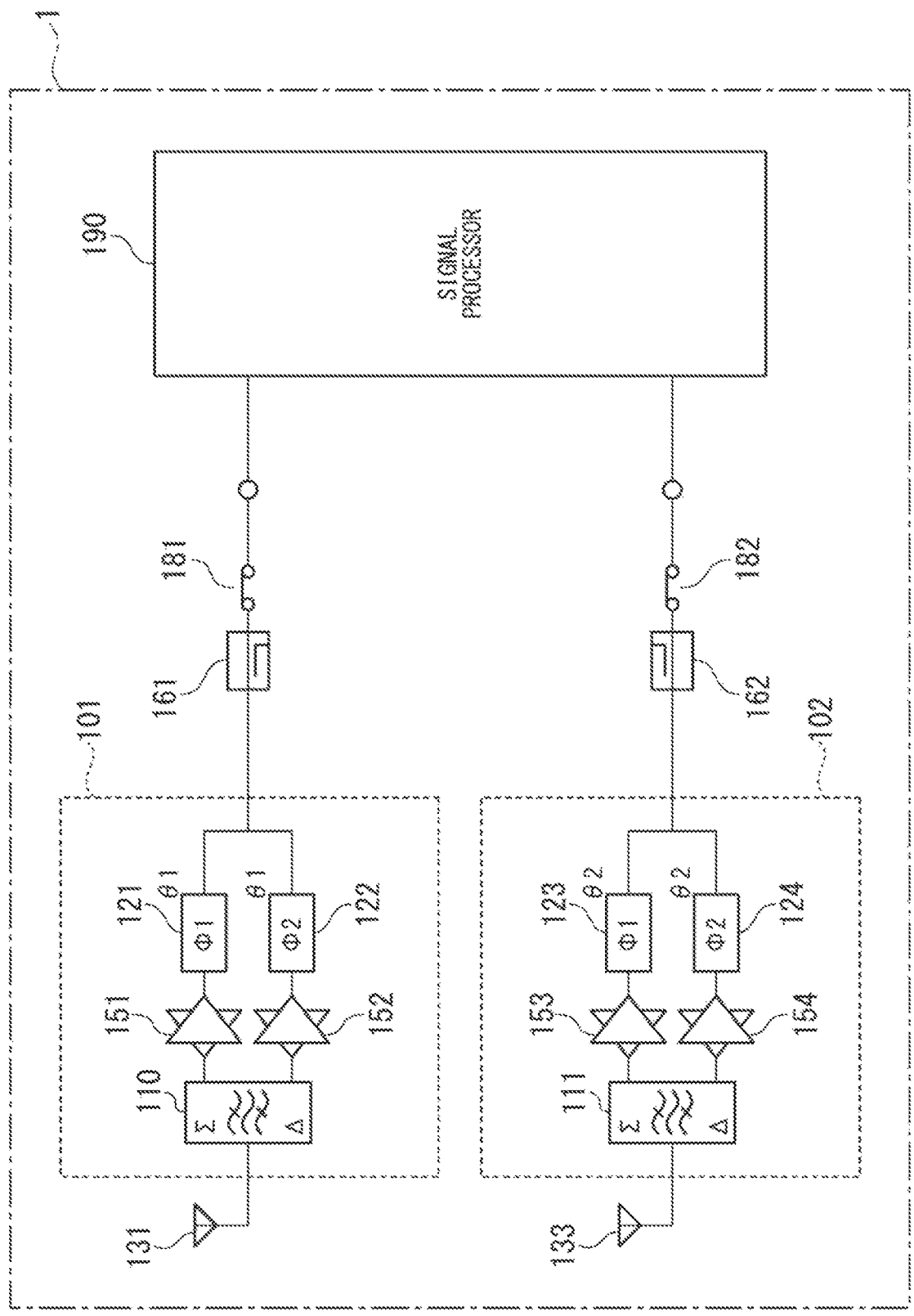
FIG. 4 is a circuit diagram used for explaining a transmission/reception process of the communication device according to the third exemplary embodiment of the present invention.

Next, the transmission/reception process of the communication device 1 will be described with reference to FIG. 4. Herein, the transmission/reception process of the communication device 1 will be described with respect to the situation in which the phase of the output signal of the first phase shifter 121 is identical to the phase of the output signal of the second phase shifter 122. In a transmission/reception mode of the communication device 1, both the first switch 181 and the second switch 182 are closed.

(Transmission Process of Communication Device 1)

First, the transmission process of the communication device 1 will be described below. In the transmission mode of the communication device 1, the signal processor 190 generates a transmission signal. The signal processor 190 transmits the transmission signal to the first pathway switch device 101 through the first directional coupler 161. In addition, the signal processor 190 transmits the transmission signal to the second pathway switch device 102 through the second directional coupler 162.

In the first pathway switch device 101, the first phase shifter 121 and the second phase shifter 122 may receive the transmission signal from the signal processor 190. The first phase shifter 121 and the second phase shifter 122 are configured to adjust the phase of the transmission signal respectively. For example, the first phase shifter 121 shifts the phase of the transmission signal by a predetermined phase value θ1 (i.e. a phase value measured from a reference phase at zero). The second phase shifter 122 shifts the phase of the transmission signal by the predetermined phase value θ1 to achieve the same phase as the first phase shifter 121. The first phase shifter 121 sends its phase-shifted transmission signal to the first bidirectional amplifier 151 while the second phase shifter 122 sends its phase-shifted transmission signal to the second bidirectional amplifier 152.

Upon receiving the phase-shifted transmission signal from the first phase shifter 121, the first bidirectional amplifier 151 amplifies its amplitude by a predetermined gain. Upon receiving the phase-shifted transmission signal from the second phase shifter 122, the second bidirectional amplifier 152 amplifies its amplitude by a predetermined gain. The first bidirectional amplifier 151 sends its amplitude-amplified transmission signal to the third terminal of the 180-degree hybrid circuit 110 while the second bidirectional amplifier 152 sends its amplitude-amplified transmission signal to the fourth terminal of the 180-degree hybrid circuit 110.

The 180-degree hybrid circuit 110 receives the amplitude-amplified transmission signals from the first bidirectional amplifier 151 and the second bidirectional amplifier 152. The 180-degree hybrid circuit 110 generates a sum signal (or a Σ signal) and a difference signal (or a Δ signal) using the transmission signals from the first bidirectional amplifier 151 and the second bidirectional amplifier 152. Subsequently, the 180-degree hybrid circuit 110 radiates the Σ signal into the air by means of the first antenna 131.

The second pathway switch device 102 carries out a similar process as the first pathway switch device 101. In the second pathway switch device 102, the third phase shifter 123 and the fourth phase shifter 124 receive the transmission signals from the signal processor 190. The third phase shifter 123 and the fourth phase shifter 124 adjust their transmission signals in phase. For example, the third phase shifter 123 shifts the phase of the transmission signal by a predetermined phase value θ2 (i.e. a phase value measured from the reference phase at zero). The fourth phase shifter 124 shifts the phase of the transmission signal by the predetermined phase value θ2 to achieve the same phase as the third phase shifter 123. The third phase shifter 123 sends its phase-shifted transmission signal to the third bidirectional amplifier 153 while the fourth phase shifter 124 sends its phase-shifted transmission signal to the fourth bidirectional amplifier 154.

Upon receiving the phase-shifted transmission signal from the third phase shifter 123, the third bidirectional amplifier 153 amplifies its amplitude by a predetermined gain. Upon receiving the phase-shifted transmission signal from the fourth phase shifter 124, the fourth bidirectional amplifier 154 amplifies its amplitude by a predetermined gain. The third bidirectional amplifier 153 sends its amplitude-amplified transmission signal to the third terminal of the 180-degree hybrid circuit 111 while the fourth bidirectional amplifier 154 sends its amplitude-amplified transmission signal to the fourth terminal of the 180-degree hybrid circuit 111.

The 180-degree hybrid circuit 111 receives the amplitude-amplified transmission signals from the third bidirectional amplifier 153 and the fourth bidirectional amplifier 154 respectively. The 180-degree hybrid circuit 111 generates a sum signal (or a Σ signal) and a difference signal (or a Δ signal) using the transmission signals from the third bidirectional amplifier 153 and the fourth bidirectional amplifier 154. Subsequently, the 180-degree hybrid circuit 111 radiates the Σ signal into the air by means of the third antenna element 133.

The first antenna element 131 and the third antenna element 133 may form an array antenna. A radiation signal of the first antenna element 131 and a radiation signal of the third antenna element 133 are synthesized in the air and transmitted through the air as radio waves having directivity.

The directivity of radio waves is determined according to a difference between the phase of transmission signals depending on phase adjustment in the first phase shifter 121 and the second phase shifter 122 and the phase of transmission signals depending on phase adjustment in the third phase shifter 123 and the fourth phase shifter 124. By adjusting the phase of transmission signals in the first phase shifter 121 and the second phase shifter 122 and the phase of transmission signals in the third phase shifter 123 and the fourth phase shifter 124, it is possible to realize an arbitrary directivity of radio waves to be radiated into the air.

Reception Process of Communication Device 1

Next, the reception process of the communication device 1 will be described below. The reception process of the communication device 1 is inverse to the aforementioned transmission process. The first antenna element 131 and the third antenna element 133 are configured to receive radio waves propagating in the air. In the first pathway switch device 101, the 180-degree hybrid circuit 110 receives the reception signal of the first antenna element 131 at the first terminal (or the Σ port). According to the reception process inverse to the transmission process, the 180-degree hybrid circuit 110 sends its reception signal to the first bidirectional amplifier 151 and the second bidirectional amplifier 152.

The first bidirectional amplifier 151 attenuates an amplitude of the reception signal from the 180-degree hybrid circuit 110 by a predetermined gain. The second bidirectional amplifier 152 attenuates the amplitude of the reception signal from the 180-degree hybrid circuit 110 by a predetermined gain. The first bidirectional amplifier 151 sends its amplitude-attenuated reception signal to the first phase shifter 121 while the second bidirectional amplifier 152 sends its amplitude-attenuated reception signal to the second phase shifter 122.

The first phase shifter 121 adjusts the phase of the amplitude-attenuated reception signal from the first bidirectional amplifier 151 while the second phase shifter 122 adjusts the phase of the amplitude-attenuated reception signal from the second bidirectional amplifier 152. The first phase shifter 121 and the second phase shifter 122 carry out phase adjustment with the reception signal which is inverse to the foregoing phase adjustment of the transmission signal. The first phase shifter 121 sends its phase-adjusted reception signal to the signal processor 190 through the first directional coupler 161 while the second phase shifter 122 sends its phase-adjusted reception signal to the signal processor 190 through the first directional coupler 161. The signal processor 190 receives a composite signal combining the phase-adjusted reception signal from the first phase shifter 121 and the phase-adjusted reception signal from the second phase shifter 122 through the first directional coupler 16.

The second pathway switch device 102 carries out a similar process as the first pathway switch device 101. In the second pathway switch device 102, the 180-degree hybrid circuit 111 receives the reception signal of the third antenna element 133 at the first terminal (or the Σ port). The 180-degree hybrid circuit 111 carries out a reception process inverse to the foregoing transmission process, thus sending the reception signal to the third bidirectional amplifier 153 and the fourth bidirectional amplifier 154.

The third bidirectional amplifier 153 attenuates the amplitude of the reception signal from the 180-degree hybrid circuit 111 by a predetermined gain. The fourth bidirectional amplifier 154 attenuates the amplitude of the reception signal from the 180-degree hybrid circuit 111 by a predetermined gain. The third bidirectional amplifier 153 sends the amplitude-attenuated reception signal to the third phase shifter 123 while the fourth bidirectional amplifier 154 sends the amplitude-attenuated reception signal to the fourth phase shifter 124.

The third phase shifter 123 carries out phase adjustment with the amplitude-attenuated reception signal from the third bidirectional amplifier 153 while the fourth phase shifter 124 carries out phase adjustment with the amplitude-attenuated reception signal from the fourth bidirectional amplifier 154. The third phase shifter 123 and the fourth phase shifter 124 carry out phase adjustment with the reception signal which is inverse to the foregoing phase adjustment with the transmission signal. The third phase shifter 123 sends its phase-adjusted reception signal to the signal processor 190 through the second directional coupler 162 while the fourth phase shifter 124 sends its phase-adjusted reception signal to the signal processor 190 through the second directional coupler 162. The signal processor 190 receives a composite signal combining the phase-adjusted reception signal from the third phase shifter 123 and the phase-adjusted reception signal from the fourth phase shifter 124 through the second directional coupler 162. Subsequently, the signal processor 190 carries out a demodulation process with two composite signals received through the first directional coupler 161 and the second directional coupler 162.

Calibration Process of Communication Device 1

Figure 5:
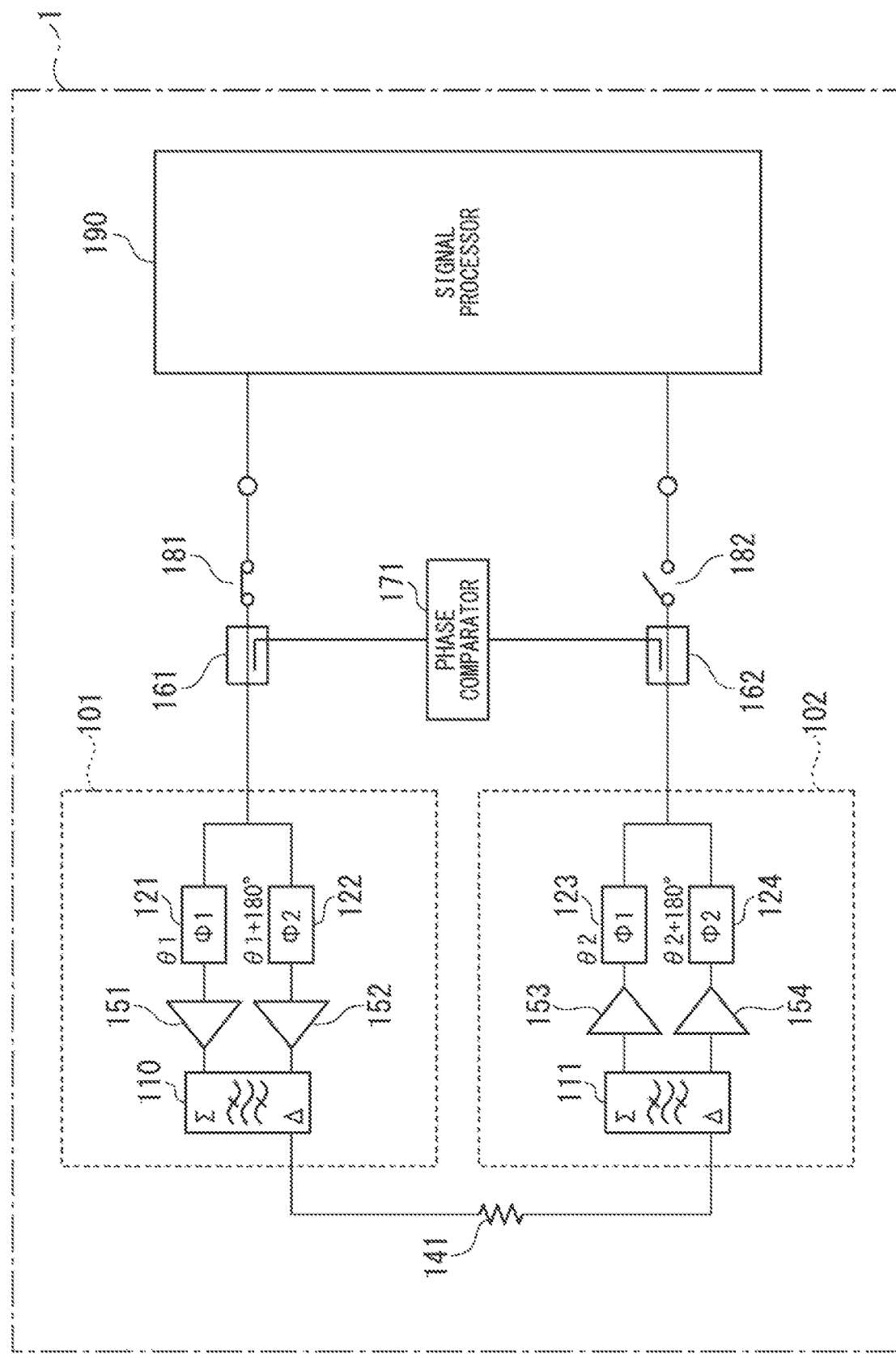
FIG. 5 is a circuit diagram used for explaining a calibration process of the communication device according to the third exemplary embodiment of the present invention.

Next, the calibration process of the communication device 1 will be described with reference to FIG. 5. In a calibration mode of the communication device 1, the first switch 181 is closed while the second switch 182 is opened. The signal processor 190 is configured to generate a calibration signal used for calibration. The signal processor 190 sends the calibration signal to the first pathway switch device 101 through the first directional coupler 161. At this time, the first directional coupler 161 branches the calibration signal from the signal processor 190 to the phase comparator 171.

The first phase shifter 121 and the second phase shifter 122 may receive the calibration signal from the signal processor 190 so as to adjust its phase. For example, the first phase shifter 121 shifts the phase of the calibration signal by a predetermined phase value θ1 (i.e. a phase value measured from a reference phase at zero). The second phase shifter 122 shifts the phase of the calibration signal by a predetermined phase value (θ1+180°) so as to achieve an inverse phase than the first phase shifter 121. The first phase shifter 121 sends its phase-shifted calibration signal to the first bidirectional amplifier 151 while the second phase shifter 122 sends its phase-shifted calibration signal to the second bidirectional amplifier 152.

The first bidirectional amplifier 151 amplifies the amplitude of the phase-shifted calibration signal from the first phase shifter 121 by a predetermined gain. In addition, the second bidirectional amplifier 152 amplifies the amplitude of the phase-shifted calibration signal from the second phase shifter 122 by a predetermined gain. The first bidirectional amplifier 151 sends its amplitude-amplified calibration signal to the third terminal of the 180-degree hybrid circuit 110 while the second bidirectional amplifier 152 sends its amplitude-amplified calibration signal to the fourth terminal of the 180-degree hybrid circuit 110.

Upon receiving the amplitude-amplified calibration signal from the first bidirectional amplifier 151 and the amplitude-amplified calibration signal from the second bidirectional amplifier 152, the 180-degree hybrid circuit 110 may generate a sum signal (or a Σ signal) and a difference signal (or a Δ signal). Subsequently, the 180-degree hybrid circuit 110 sends the Δ signal to the second pathway switch device 102 via the attenuator 141.

In the second pathway switch device 102, the 180-degree hybrid circuit 111 receives the calibration signal (or the Δ signal) from the first pathway switch device 101 at the second terminal (or the Δ port) so as to carry out a similar process as the foregoing process in the reception mode, thus sending the calibration signal to the third bidirectional amplifier 153 and the fourth bidirectional amplifier 154. The third bidirectional amplifier 153 attenuates the amplitude of the calibration signal from the 180-degree hybrid circuit 111 by a predetermined gain. The fourth bidirectional amplifier 154 attenuates the amplitude of the calibration signal from the 180-degree hybrid circuit 111 by a predetermined gain. The amplitude-amplified calibration signal from the third bidirectional amplifier 153 is sent to the third phase shifter 123 while the amplitude-amplified calibration signal from the fourth bidirectional amplifier 154 is send to the fourth phase shifter 124. The third phase shifter 123 and the fourth phase shifter 124 carries out phase adjustment of the calibration signal, which is similar to the foregoing phase adjustment of the reception signal. The third phase shifter 123 and the fourth phase shifter 124 send their phase-adjusted calibration signals to the phase comparator 171 through the second directional coupler 162.

The phase comparator 171 receives the calibration signal from the first directional coupler 161 and the calibration signal from the second directional coupler 162. The phase comparator 171 compares two calibration signals in phase so as to produce a comparison result. Even when the comparison result of the phase comparator 171 is not a desired result, the present embodiment may produce a desired result by changing a setting of pathways transmitting calibration signals. To obtain a desired comparison result, for example, the present embodiment is designed to change phase adjustments of the first phase shifter 121, the second phase shifter 122, the third phase shifter 123, and the fourth phase shifter 124.

As described above, the communication device 1 according to the third exemplary embodiment of the present invention includes the first pathway switch device 101, the second pathway switch device 102, and the attenuator 141 provided therebetween. Due to the provision of the first pathway switch device 101 and the second pathway switch device 102, it is possible to reduce the size of the communication device 1 to be smaller than the foregoing configuration requiring a bandpass filter for each polarization. In addition, it is possible to independently set the frequency of a sum signal (or a Σ signal) and the frequency of a difference signal (or a Δ signal), and therefore it is possible to receive or transmit signals according to a setting of frequencies. Moreover, due to the provision of the attenuator 141 connected between the first pathway switch device 101 and the second pathway switch device 102, it is possible to grasp how a setting of signal propagation pathways will be changed in the communication device 1, and therefore it is possible to obtain desired signals by changing a setting of signal propagation pathways.

In a transmission/reception mode of the third exemplary embodiment of the present invention, phase adjustment is carried out such that the first phase shifter 121 and the second phase shifter 122 may produce their output signals having the same phase while phase adjustment is carried out such that the third phase shifter 123 and the fourth phase shifter 124 may produce their output signals having the same phase. In a calibration mode, phase adjustment is carried out such that the first phase shifter 121 and the second phase shifter 122 may produce their output signals having reverse phases while phase adjustment is carried out such that the third phase shifter 123 and the fourth phase shifter 124 may produce their output signals having reverse phases.

Figure 6:
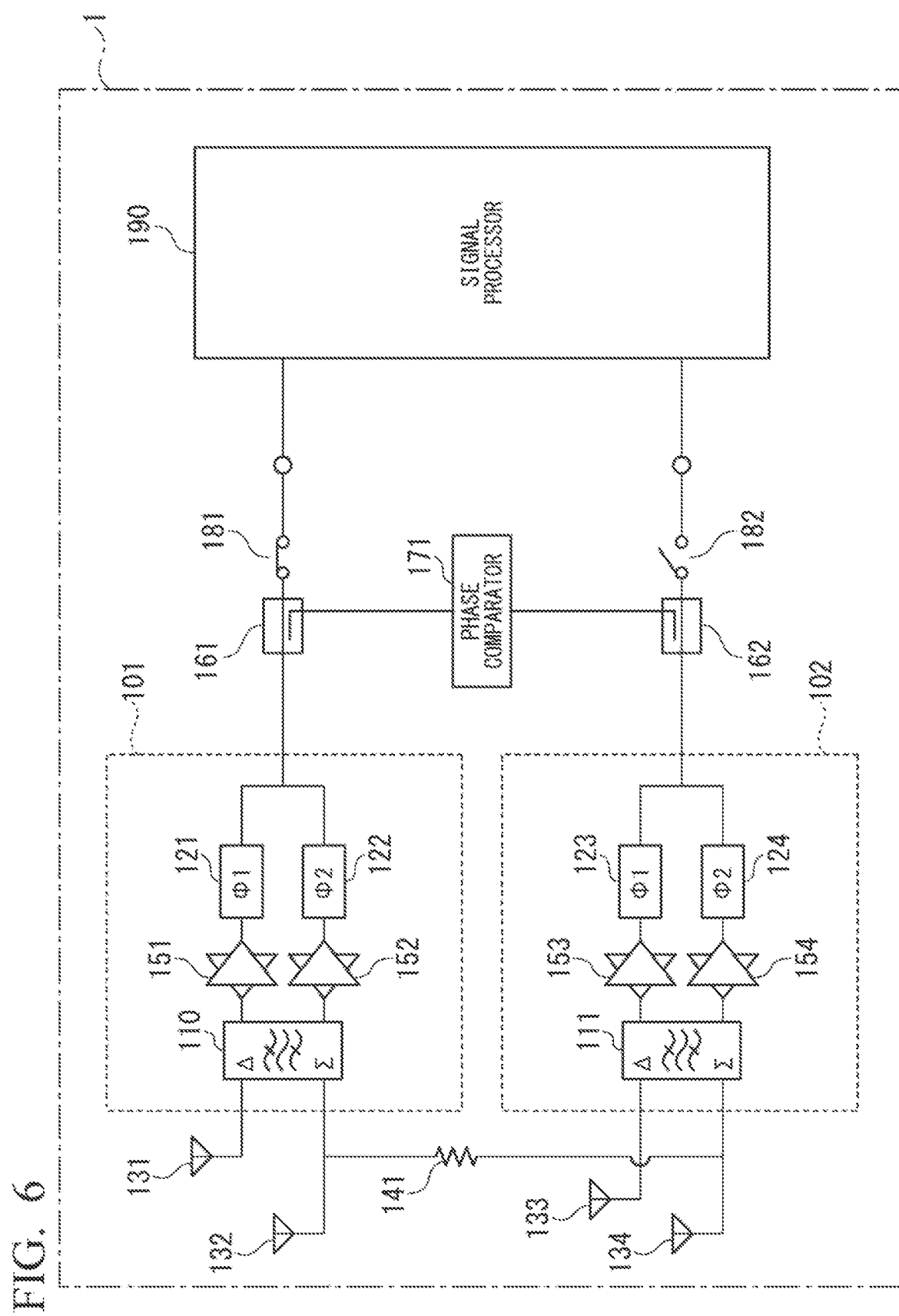
FIG. 6 is a circuit diagram of a communication device according to a variation of the third exemplary embodiment of the present invention.

It is possible to modify the communication device 1 of the third exemplary embodiment of the present invention with the configuration shown in FIG. 6. The configuration of FIG. 6 may seem to be identical to the configuration of FIG. 3, whereas the configuration of FIG. 6 realizes different functions with the first and second terminals of the 180-degree hybrid circuits 110, 111. That is, in FIG. 6, the first antenna element 131 is connected to the Δ port of the 180-degree hybrid circuit 110 while the third antenna element 133 is connected to the Δ port of the 180-degree hybrid circuit 111. In addition, the second antenna element 132 is connected to the Σ port of the 180-degree hybrid circuit 111 while the fourth antenna element 134 is connected to the Σ port of the 180-degree hybrid circuit 111. In addition, the attenuator 141 is provided between the Σ port of the 180-degree hybrid circuit 110 and the Σ port of the 180-degree hybrid circuit 111. In a transmission/reception mode, phase adjustment is carried out such that the first phase shifter 121 and the second phase shifter 122 may produce their output signals having reverse phases while phase adjustment is carried out such that the third phase shifter 123 and the fourth phase shifter 124 may produce their output signals having reverse phases. In a calibration mode, phase adjustment is carried out such that the first phase shifter 121 and the second phase shifter 122 may produce their output signals having the same phase while phase adjustment is carried out such that the third phase shifter 123 and the fourth phase shifter 124 may produce their output signals having the same phase. As described above, according to a variation of the third exemplary embodiment shown in FIG. 6 similar to the third exemplary embodiment shown in FIG. 3, it is possible to realize both the transmission/reception process and the calibration process.

Fourth Exemplary Embodiment

Figure 7:
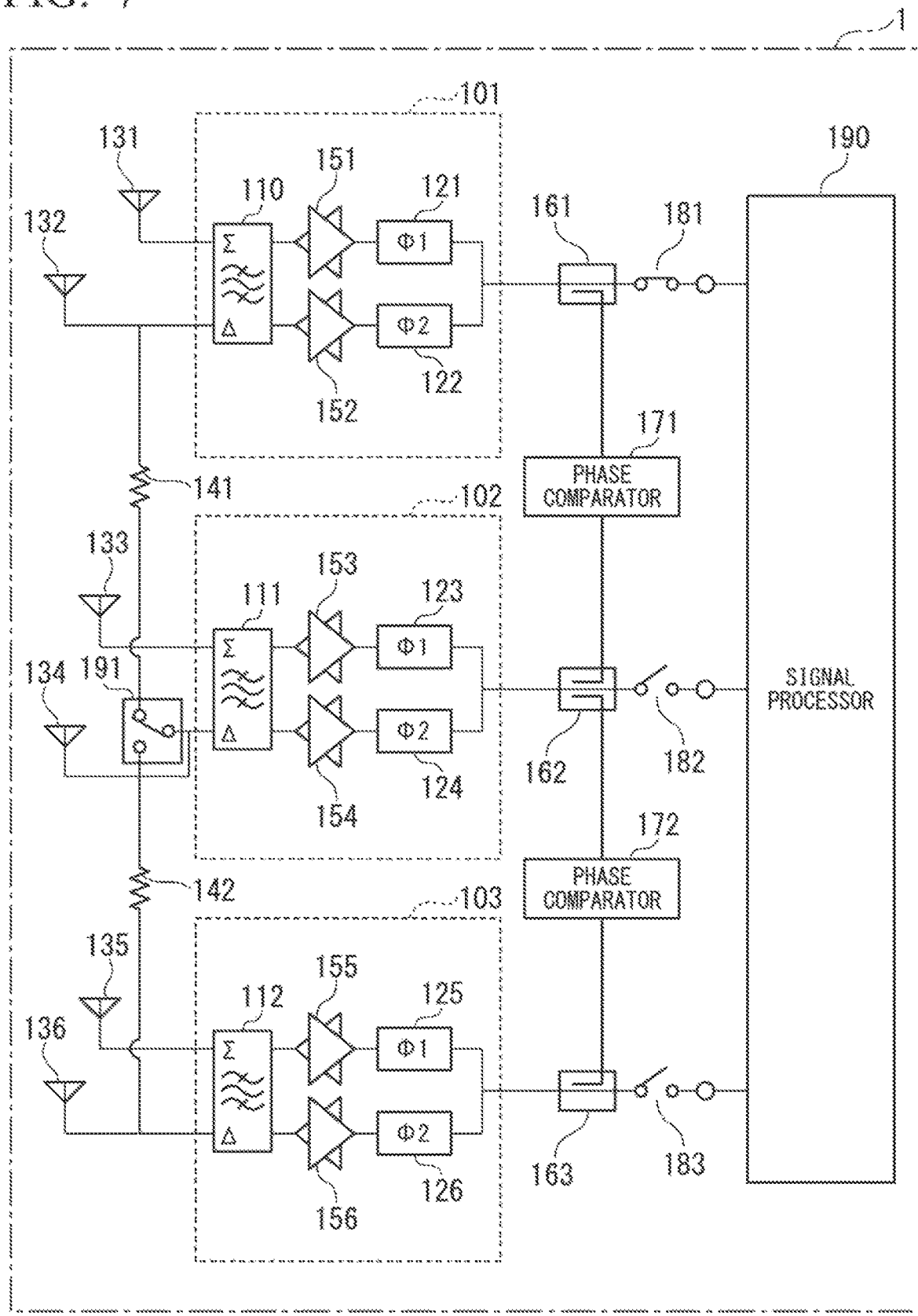
FIG. 7 is a circuit diagram of a communication device according to the fourth exemplary embodiment of the present invention.

Next, the communication device 1 according to the fourth exemplary embodiment of the present invention will be described below. FIG. 7 is a circuit diagram of the communication device 1 according to the fourth exemplary embodiment of the present invention. As shown in FIG. 7, the communication device 1 includes the first pathway switch device 101, the second pathway switch device 102, the first antenna element 131, the second antenna element 132, the third antenna element 133, the fourth antenna element 134, the attenuator 141, the first directional coupler 161, the second directional coupler 162, the phase comparator 171, the first switch 181, the second switch 182, and the signal processor 190. In addition, the communication device 1 further includes a third pathway switch device 103, a fifth antenna element 135, a sixth antenna element 136, an attenuator 142, a third directional coupler 163, a phase comparator 172, a third switch 183, and a switch 191.

The third pathway switch device 103 operates similar to the first pathway switch device 101. The fifth antenna element 135 is similar to the first antenna element 131 while the sixth antenna element 136 is similar to the second antenna element 132. The attenuator 142 operates similar to the attenuator 141. The third directional coupler 163 operates similar to the first directional coupler 161. The phase comparator 172 operates similar to the phase comparator 171. The third switch 183 operates similar to the first switch 181.

The third pathway switch device 103 includes a 180-degree hybrid circuit 11, a fifth phase shifter 125, a sixth phase shifter 126, a fifth bidirectional amplifier 155, and a sixth bidirectional amplifier 156. The first terminal of the third pathway switch device 103 is connected to the first terminal (or the Σ port) of the 180-degree hybrid circuit 112 while the second terminal of the third pathway switch device 103 is connected to the third terminal (or the Δ port) of the 180-degree hybrid circuit 112. The third terminal of the 180-degree hybrid circuit 112 is connected to the first terminal of the fifth bidirectional amplifier 155 while the fourth terminal of the 180-degree hybrid circuit 112 is connected to the first terminal of the sixth bidirectional amplifier 156. The second terminal of the fifth bidirectional amplifier 155 is connected to the first terminal of the fifth phase shifter 125 while the second terminal of the sixth bidirectional amplifier 156 is connected to the first terminal of the sixth phase shifter 126. The second terminal of the fifth phase shifter 125 and the second terminal of the sixth phase shifter 126 are connected to the third terminal of the third pathway switch device 103.

The communication device 1 of the fourth exemplary embodiment shown in FIG. 7 includes the configuration of the communication device 1 of the third exemplary embodiment shown in FIG. 3, whereas the switch 191 is provided between the attenuator 141 and the 180-degree hybrid circuit 111. In addition, the communication device 1 of the fourth exemplary embodiment differs from the communication device 1 of the third exemplary embodiment such that the second directional coupler 162 branches a signal transmitted over a line laid between the second pathway switch device 102 and the signal processor 190 towards the phase comparator 171 and the phase comparator 172. That is, the second directional coupler 162 further includes a fourth terminal connected to the first terminal of the phase comparator 172 in addition to the third terminal connected to the phase comparator 171.

The switch 191 is interposed between the attenuator 141, the attenuator 142, and the 180-degree hybrid circuit 111. Specifically, the first terminal of the switch 191 is connected to the second terminal (or the Δ port) of the 180-degree hybrid circuit 111; the second terminal of the switch 191 is connected to the attenuator 141; the third terminal of the switch 191 is connected to the attenuator 142.

The first terminal of the third pathway switch device 103 is connected to the fifth antenna element 135 while the second terminal of the third pathway switch device 103 is connected to the sixth antenna element 136 and the attenuator 142. The third terminal of the third pathway switch device 103 is connected to the first terminal of the third directional coupler 163. The second terminal of the third directional coupler 163 is connected to the third switch 183. The third terminal of the third directional coupler 163 is connected to the second terminal of the phase comparator 172. The second terminal of the third switch 183 is connected to the signal processor 190.

The communication device 1 of the third exemplary embodiment of the present invention is equipped with the first pathway switch device 101 and the second pathway switch device 102 each serving as a signal transmission device, while the communication device 1 of the fourth exemplary embodiment of the present invention further includes the third pathway switch device 103, and therefore the signal processor 190 is configured to carry out signal processing with respect to three signals transmitted through the first pathway switch device 101, the second pathway switch device 102, and the third pathway switch device 103.

The operation of the communication device 1 of the fourth exemplary embodiment is similar to the operation of the communication device 1 of the third exemplary embodiment, wherein the third exemplary embodiment is designed to carry out the transmission/reception process with two signals transmitted through two pathway switch devices 101, 102 while the fourth exemplary embodiment is designed to carry out the transmission/reception process with three signals transmitted through three pathway switch devices 101, 102, and 103. When the first terminal is connected to the second terminal in the switch 191, the calibration process of the communication device 1 of the fourth exemplary embodiment is similar to the calibration process of the communication device 1 of the third exemplary embodiment. When the first terminal is connected to the third terminal in the switch 191, the second terminal (or the Δ port) of the third pathway switch device 101 is connected to the second terminal (or the Δ port) of the third pathway switch device 103 through the attenuators 141, 142, in other words, the first pathway switch device 101 should be connected to the third pathway switch device 103 instead of the second pathway switch device 102. That is, the function of the second pathway switch device 102 is replaced with the third pathway switch device 103, wherein a calibration signal (or a Δ signal) from the first pathway switch device 101 is sent to the third pathway switch device 103 through the attenuators 141, 142, and then the calibration signal is sent to the phase comparator 172 through the third directional coupler 163, thus implementing a phase comparison process.

As described above, the communication device 1 of the fourth exemplary embodiment of the present invention includes the first pathway switch device 101, the second pathway switch device 102, and the third pathway switch device 103, and therefore it is possible to reduce the size of the communication device compared to the foregoing configuration including a bandpass filter for each polarization. In addition, it is possible for the communication device 1 to carry out the transmission/reception process by independently setting the frequency of a sum signal (or a Σ signal) and the frequency of a difference signal (or a Δ signal). Providing the switch 191 in the communication device 1, it is possible to connect the first pathway switch device 101 to either the second pathway switch device 102 or the third pathway switch device 103. Accordingly, it is possible to grasp how to change a setting of signal transmission pathways in the communication device 1, and therefore it is possible to obtain a desired signal by changing a setting of signal transmission pathways.

In a transmission/reception mode, the fourth exemplary embodiment of the present invention is designed to carry out phase adjustment such that the first phase shifter 121 and the second phase shifter 122 may produce their output signals having the same phase, phase adjustment such that the third phase shifter 123 and the fourth phase shifter 124 may produce their output signals having the same phase, and phase adjustment such that the fifth phase shifter 125 and the sixth phase shifter 126 may produce their output signals having the same phase. In a calibration mode, the fourth exemplary embodiment of the present invention is designed to carry out phase adjustment such that the first phase shifter 121 and the second phase shifter 122 may produce their output signals having reverse phases, phase adjustment such that the third phase shifter 123 and the fourth phase shifter 124 may produce their output signals having reverse phases, and phase adjustment such that the fifth phase shifter 125 and the sixth phase shifter 126 may produce their output signals having reverse phases.

Figure 8:
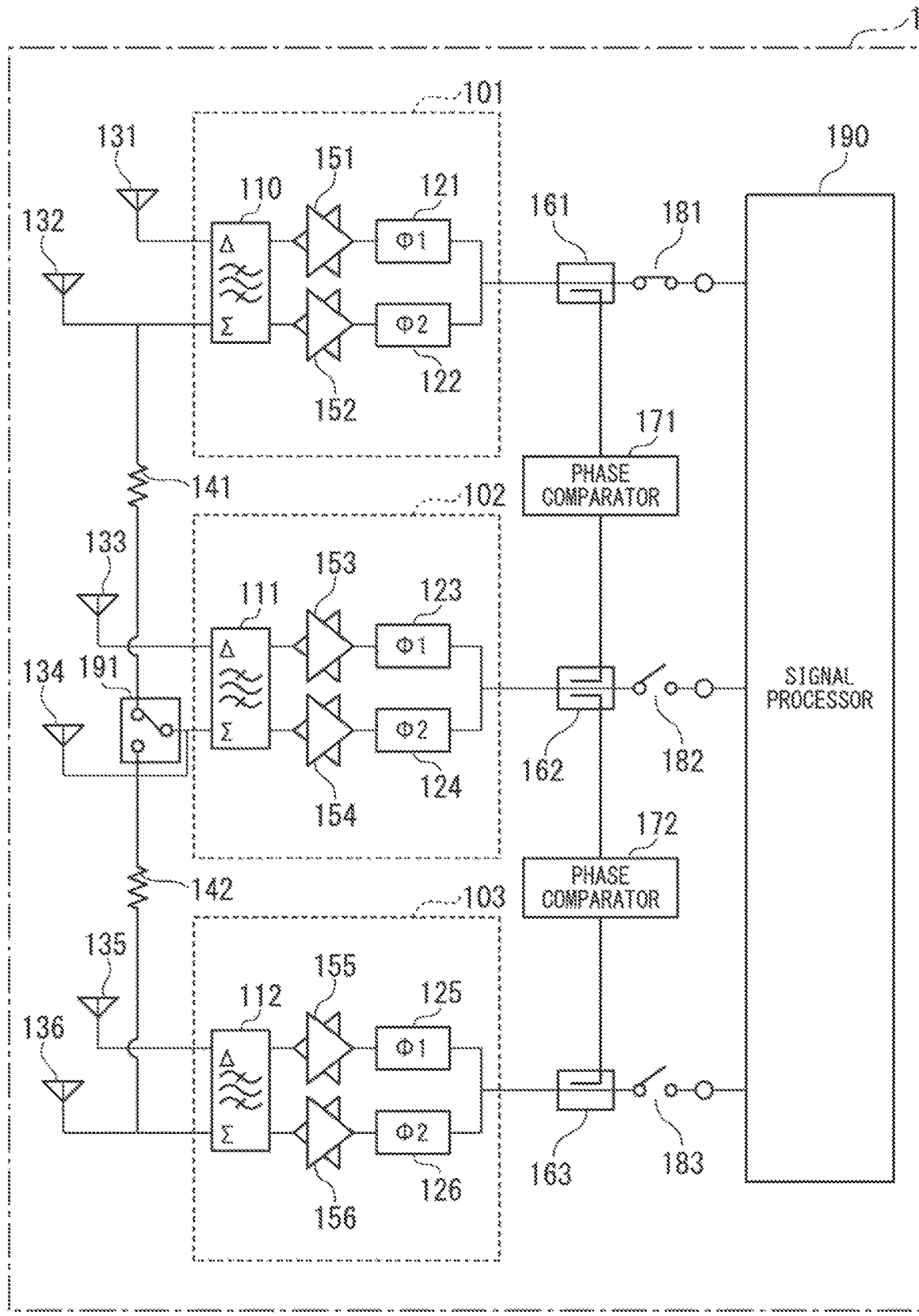
FIG. 8 is a circuit diagram of a communication device according to a variation of the fourth exemplary embodiment of the present invention.

It is possible to modify the communication device 1 of the fourth exemplary embodiment of the present invention with the configuration shown in FIG. 8. The configuration of FIG. 8 seems to be identical to the configuration of FIG. 7, whereas the first and second terminals of the 180-degree hybrid circuits 110, 111 have different functions. In FIG. 8, the first antenna element 131 is connected to the Δ port of the 180-degree hybrid circuit 110; the third antenna element 133 is connected to the Δ port of the 180-degree hybrid circuit 111; the fifth antenna element 135 is connected to the Δ port of the 180-degree hybrid circuit 112. In addition, the second antenna element 132 is connected to the Σ port of the 180-degree hybrid circuit 110; the fourth antenna element 134 is connected to the Σ port of the 180-degree hybrid circuit 111; the sixth antenna element 136 is connected to the Σ port of the 180-degree hybrid circuit 112. Moreover, the attenuator 141 is provided between the Σ port of the 180-degree hybrid circuit 110 and the Σ port of the 180-degree hybrid circuit 111 while the attenuator 142 is provided between the Σ port of the 180-degree hybrid circuit 111 and the Σ port of the 180-degree hybrid circuit 112. That is, the switch 191 changes the connection destination of the attenuators 141, 142 from the Δ port to the Σ port. In a transmission/reception mode, phase adjustment is carried out such that the first phase shifter 121 and the second phase shifter 122 may produce their output signals having reverse phases; phase adjustment is carried out such that the third phase shifter 123 and the fourth phase shifter 124 may produce their output signals having reverse phases; phase adjustment is carried out such that the fifth phase shifter 125 and the sixth phase shifter 126 may produce their output signals having reverse phases. In a calibration mode, phase adjustment is carried out such that the first phase shifter 121 and the second phase shifter 122 may produce their output signals having the same phase; phase adjustment is carried out such that the third phase shifter 123 and the fourth phase shifter 124 may produce their output signals having the same phase; phase adjustment is carried out such that the fifth phase shifter 125 and the sixth phase shifter 126 may produce their output signals having the same phase. Similar to the fourth exemplary embodiment shown in FIG. 7, a variation of the fourth exemplary embodiment shown in FIG. 8 is able to achieve both the transmission/reception process and the calibration process.

As described heretofore, the communication device of the present invention has been described by way of the first exemplary embodiment to the fourth exemplary embodiment, whereas it is possible to appropriately change constituent elements, functional parts as well as connection orders and processing procedures. For example, the signal processor 190 is configured to store signal processing and data in advance, but a storage unit (or a storage device) configured to store information and data may not be necessarily arranged inside the communication device and can be arranged outside the communication device. In addition, it is possible to disperse information and data and to store multiple pieces of information and data on multiple storage devices.

In the foregoing embodiments, the signal processor 190 and the other controller (not shown) may include a computer system therein, and therefore programs demonstrating the foregoing processes can be stored on computer-readable storage media. In this case, the computer system may read and execute programs from storage media, thus achieving the foregoing functions.

Figure 9:
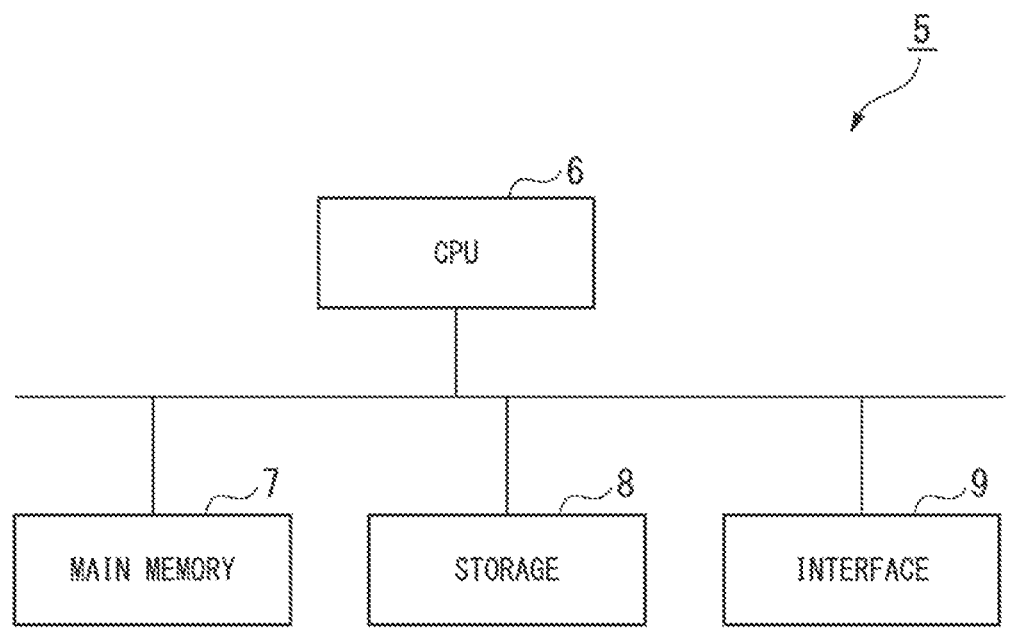
FIG. 9 is a block diagram showing a diagrammatic configuration of a computer realizing the communication device according to the first exemplary embodiment through the fourth exemplary embodiment of the present invention.

FIG. 9 is a block diagram showing the diagrammatical configuration of a computer 5 realizing the functions of the communication device 1 according to the foregoing exemplary embodiments. The computer 5 includes a CPU 6, a main memory 7, a storage 8, and an interface 9. The foregoing functions of the signal processor 190 and the foregoing functions of other control devices are implemented by the computer 5. The foregoing steps of processes are stored on the storage 8 in the form of programs. The CPU 6 reads programs from the storage 8 to expand and execute programs on the main memory 7. The CPU 6 may secure a plurality of storage areas on the main memory 7 according to programs.

As the storage 8, for example, it is possible to mention HDD (Hard Disk Drive), SSD (Solid State Drive), magnetic disks, magneto-optical disks, CD-ROM, DVD-ROM, and semiconductor memory. The storage 8 may be internal storage media directly connected to buses of the computer 5 or external storage media connected to the computer 5 through communication lines or the interface 9. When the foregoing programs are delivered to the computer 5 through communication lines, the computer 5 may expand programs on the main memory 7 to achieve the foregoing steps of processes. When the foregoing embodiments are applied to the computer 5, the storage 8 may be a non-transitory tangible storage medium.

The foregoing programs may achieve part of the foregoing functions of a communication device. Alternatively, the foregoing programs may be differential programs (or differential files) to achieve the foregoing functions when combined with pre-installed programs already stored in a computer system.

Lastly, the function and the configuration of a communication device according to the present invention is not necessarily limited to the foregoing embodiments, which may not necessarily limit the scope of the invention. The foregoing embodiments may embrace various additions, omissions, replacements, and modifications without departing from the essence of the invention.

The present application claims the benefit of priority on Japanese Patent Application No. 2018-168805 filed on Sep. 10, 2018, the subject matter of which is hereby incorporated herein by reference.

INDUSTRIAL APPLICABILITY

The present invention is applied to a communication device holding radio communication using different polarizations, wherein the communication device can be embedded in various types of electronic devices such as portable terminal devices, mobile phones, and in-vehicle devices other than radio communication devices.

REFERENCE SIGNS LIST 1 communication device
100 pathway switch device
101 first pathway switch device
102 second pathway switch device
110, 111, 112 180-degree hybrid circuit
121 first phase shifter
122 second phase shifter
123 third phase shifter
124 fourth phase shifter
125 fifth phase shifter
126 sixth phase shifter
131 first antenna element
132 second antenna element
133 third antenna element
134 fourth antenna element
135 fifth antenna element
136 sixth antenna element
141, 142 attenuator
151 first bidirectional amplifier
152 second bidirectional amplifier
153 third bidirectional amplifier
154 fourth bidirectional amplifier
155 fifth bidirectional amplifier
156 sixth bidirectional amplifier
161 first directional coupler
162 second directional coupler
163 third directional coupler
171, 172 phase comparator
181 first switch
182 second switch
183 third switch
190 signal processor
191 switch

What is claimed is:

1. A communication device comprising:
a first antenna element;
a second antenna element;
a 180-degree hybrid circuit having a first port configured to generate a sum signal from a plurality of input signals and a second port configured to generate a difference signal from the plurality of input signals;
a first phase shifter coupled with the 180-degree hybrid circuit to carry out a phase shift by a first phase value; and
a second phase shifter coupled with the 180-degree hybrid circuit to carry out a phase shift by a second phase value,
wherein the first antenna element is connected to the first port of the 180-degree hybrid circuit while the second antenna element is connected to the second port of the 180-degree hybrid circuit, and
wherein the 180-degree hybrid circuit is configured by aligning a first excitation opening adapted to a first electromagnetic-field mode and a second excitation opening adapted to a second electromagnetic-field mode in a T-shape manner.

2. A communication device comprising:
a first communicator coupled with a first antenna element and a second antenna element;
a second communicator coupled with a third antenna element and a fourth antenna element; and
a connector configured to connect the first communicator and the second communicator together,
wherein the first communicator and the second communicator have a same configuration including a 180-degree hybrid circuit having a first port configured to generate a sum signal from a plurality of input signals and a second port configured to generate a difference signal from the plurality of input signals, a first phase shifter coupled with the 180-degree hybrid circuit to carry out a phase shift by a first phase value, and a second phase shifter coupled with the 180-degree hybrid circuit to carry out a phase shift by a second phase value,
wherein the first antenna element is connected to the first port of the 180-degree hybrid circuit via a first terminal of the first communicator while the second antenna element is connected to the second port of the 180-degree hybrid circuit via a second terminal of the first communicator, wherein the third antenna element is connected to the first port of the 180-degree hybrid circuit via a first terminal of the second communicator while the fourth antenna element is connected to the second port of the 180-degree hybrid circuit via a second terminal of the second communicator, wherein in the first communicator, the first phase shifter and the second phase shifter are commonly connected to a third terminal of the first communicator, wherein in the second communicator, the first phase shifter and the second phase shifter are commonly connected to a third terminal of the second communicator, and wherein the connector is connected between the second terminal of the first communicator and the second terminal of the second communicator.

3. The communication device according to claim 2, further comprising a phase comparator coupled with the third terminal of the first communicator and the third terminal of the second communicator, wherein a first calibration signal is input to the third terminal of the first communicator while the first communicator generates the difference signal based on the first calibration signal so as to output the difference signal at the second terminal such that the difference signal is transmitted to the second terminal of the second communicator through the connector, wherein the second communicator is configured to generate a second calibration signal responsive to the difference signal so as to output the second calibration signal at the third terminal, and wherein the phase comparator is configured to adjust the first phase value of the first phase shifter and the second phase value of the second phase shifter according to a phase difference between the first calibration signal and the second calibration signal in the first communicator and the second communicator respectively.

4. The communication device according to claim 2, wherein the connector is an attenuator configured to attenuate a signal from the second terminal of the first communicator so as to transmit an attenuated signal to the second terminal of the second communicator.

5. A communication device comprising:
a first communicator coupled with a first antenna element and a second antenna element;
a second communicator coupled with a third antenna element and a fourth antenna element;
a third communicator coupled with a fifth antenna element and a sixth antenna element;
a first connector configured to connect the first communicator and the second communicator together;
a second connector configured to connect the second communicator and the third communicator together; and
a switch configured to switch over a connection between the first communicator and the second communicator and another connection between the first communicator and the third communicator, wherein the first communicator, the second communicator, and the third communicator have a same configuration including a 180-degree hybrid circuit having a first port configured to generate a sum signal from a plurality of input signals and a second port configured to generate a difference signal from the plurality of input signals, a first phase shifter coupled with the 180-degree hybrid circuit to carry out a phase shift by a first phase value, and a second phase shifter coupled with the 180-degree hybrid circuit to carry out a phase shift by a second phase value, wherein the first antenna element is connected to the first port of the 180-degree hybrid circuit via a first terminal of the first communicator while the second antenna element is connected to the second port of the 180-degree hybrid circuit via a second terminal of the first communicator, wherein the third antenna element is connected to the first port of the 180-degree hybrid circuit via a first terminal of the second communicator while the fourth antenna element is connected to the second port of the 180-degree hybrid circuit via a second terminal of the second communicator, wherein the fifth antenna element is connected to the first port of the 180-degree hybrid circuit via a first terminal of the third communicator while the sixth antenna element is connected to the second port of the 180-degree hybrid circuit via a second terminal of the third communicator, wherein in the first communicator, the first phase shifter and the second phase shifter are commonly connected to a third terminal of the first communicator, wherein in the second communicator, the first phase shifter and the second phase shifter are commonly connected to a third terminal of the second communicator, wherein in the third communicator, the first phase shifter and the second phase shifter are commonly connected to a third terminal of the third communicator, wherein the first connector is connected between the second terminal of the first communicator and the second terminal of the second communicator via the switch, wherein the second connector is connected between the second terminal of the second communicator and the second terminal of the third communicator via the switch, and wherein the switch is configured to switch over a connection between the second terminal of the first communicator and the second terminal of the second communicator and another connection between the second terminal of the first communicator and the second terminal of the third communicator.

* * * * *